United States Patent [19]

Lipton

[11] Patent Number: 5,686,975
[45] Date of Patent: Nov. 11, 1997

[54] POLAREL PANEL FOR STEREOSCOPIC DISPLAYS

[75] Inventor: Lenny Lipton, San Rafael, Calif.

[73] Assignee: StereoGraphics Corporation, San Rafael, Calif.

[21] Appl. No.: 139,267

[22] Filed: Oct. 18, 1993

[51] Int. Cl.$^6$ .................... G02F 1/1335; G02B 27/26; H04N 9/47
[52] U.S. Cl. .................. 349/15; 349/74; 349/194; 359/465; 359/489
[58] Field of Search .................. 359/37, 53, 63, 359/48, 74, 75, 465, 489, 494; 348/57, 58; 349/15, 74, 96, 193, 194

[56] References Cited

U.S. PATENT DOCUMENTS

| | | | |
|---|---|---|---|
| 2,218,875 | 10/1940 | Parsell | 88/16.6 |
| 2,301,254 | 11/1942 | Carnahan | 178/6.5 |
| 2,309,879 | 2/1943 | Willis | 88/16.6 |
| 2,385,687 | 9/1945 | Carnahan | 88/65 |
| 2,617,329 | 11/1952 | Dreyer | 88/65 |
| 2,623,433 | 12/1952 | Stipek | 88/16.6 |
| 2,631,496 | 3/1953 | Rehorn | 88/29 |
| 2,647,440 | 8/1953 | Rehorn | 88/65 |
| 2,883,906 | 4/1959 | Rehorn | 88/29 |
| 3,275,745 | 9/1966 | Var | 178/6.5 |
| 3,624,273 | 11/1971 | Gale | 178/5.4 R |
| 4,251,137 | 2/1981 | Knop et al. | 359/95 |
| 4,431,265 | 2/1984 | Benton | 350/132 |
| 4,630,097 | 12/1986 | Marks | 358/3 |
| 4,729,640 | 3/1988 | Sakata | 359/95 |
| 4,884,876 | 12/1989 | Lipton et al. | 350/347 |
| 4,967,268 | 10/1990 | Lipton et al. | 358/46 |
| 5,007,715 | 4/1991 | Verhulst | 350/334 |
| 5,042,921 | 8/1991 | Sato et al. | 359/73 |
| 5,050,961 | 9/1991 | Venolia | 359/465 |
| 5,113,285 | 5/1992 | Franklin et al. | 359/465 |
| 5,148,302 | 9/1992 | Nagano et al. | 359/81 |
| 5,235,449 | 8/1993 | Imazaki et al. | 359/63 |
| 5,268,782 | 12/1993 | Wenz et al. | 359/81 |

FOREIGN PATENT DOCUMENTS

| | | | |
|---|---|---|---|
| 3205483 A1 | 8/1983 | Germany. | |
| 3214327 A1 | 10/1983 | Germany. | |
| 58-184929 | 10/1983 | Japan. | |
| 0274922 | 11/1988 | Japan | 359/465 |
| 3223811 | 10/1991 | Japan | 359/37 |
| 3264919 | 11/1991 | Japan | 359/465 |
| 1 523 436 | 8/1978 | United Kingdom. | |
| 2 111 798 | 7/1983 | United Kingdom. | |

OTHER PUBLICATIONS

"Polaroid Black and White Vectograph Images: A Guide" by Polaroid Corp., 1985.
"Micro–Polarizer Arrays to a New Class of Stereoscopic Imaging" by Sadeg M. Faris; SID 91 Digest; pp. 840–843.
"Optical Characteristics of Twisted Nematic Liquid–Crystal Films" by C.H. Gooch & H.A. Tarry; Electronics Letters, vol. 10, No. 1; Jan. 10, 1974.

*Primary Examiner*—William L. Sikes
*Assistant Examiner*—Tai V. Duong
*Attorney, Agent, or Firm*—Limbach & Limbach, LLP

[57] ABSTRACT

A polarel panel includes a sheet polarizer in intimate juxtaposition with a layer made up of regions of isotropic material interspersed with regions of liquid crystal material. In one embodiment, optical activity of the liquid crystal material rotates the electric vector of incoming linearly polarized light through 90° in selected areas. In another embodiment, birefringence causes rotation of the electric vector of incoming linearly polarized light through 90° in selected areas.

2 Claims, 4 Drawing Sheets

POLAREL PANEL FOR STEREOSCOPIC DISPLAYS

FIELD OF THE INVENTION

The present invention relates to stereoscopic displays, and more particularly, to polarizing elements and their use in intimate juxtaposition with an interdigitated pixel array of left and right image elements for a plano-stereoscopic display.

BACKGROUND OF THE INVENTION

Full color stereoscopic images may be viewed using individual selection devices, such as glasses, which have polarizing filters in them. The means for producing such polarizing glasses and the description of these glasses is well known and need not be described in detail herein. However, it should be noted that if linearly polarized light is used for encoding the image, then the polarization axes of each polarizing filter (one for each eye) must be orthogonal to each other. If circularly polarized light is used for encoding the image, then circular polarizing filters of opposite handedness must be used in the eyewear.

There are three interesting methods through which multiple viewers can view plano-stereoscopic displays using polarizing individual selection devices: (1) polarization encoding by means of projection, in which case the images may be presented simultaneously or sequentially; (2) by means of the Vectograph; and (3) by means using polarized picture elements. All of these techniques have been explored in the prior art.

As noted below, there is substantial literature with regard to the last method, and it is that method which interests us here, namely, using closely interspersed picture elements (hereinafter called "interpixels" as short for interdigitated pixels) which have acquired suitable polarization characteristics, one for each viewpoint, to form an unobtrusive pattern with each polarization characteristic comprising 50% of the image.

This disclosure describes a method for manufacturing such a display by employing a sheet or panel having regions of isotropic material interspersed with regions of liquid crystal (LC) material (hereinafter called a "polarel" sheet, as short for polarizing element). In the isotropic regions, the axis of the electric vector is unchanged. In the LC regions, the axis of incoming linearly polarized light is rotated through ninety degrees by the process of optical activity. Thus, a polarel sheet is made up of regions in which the electric vectors of incoming polarized light are at right angles to each other. The combination of a polarel sheet and interpixels will hereinafter be called a "polarpixel."

There is a large body of prior art for this type of display. The earliest reference I can locate is U.S. Pat. No. 2,218,875 to Parsell (1940). This quotation from column 1 of his specification provides a description of this type of display:

"Features of this invention include that right and left views of this subject are caused to be produced on an image screen as a plurality of image elements with the image elements of the right view independent of the image elements of the left view, and that the light rays of the right and left image elements are brought to the right and left eyes respectively of an observer by virtue of optical elements such as polarizing elements which are appropriate to produce this result.... By having the individual polarizing elements adjacent the image screen of a small size, they can be made scarcely, if at all, visible to the eyes of the observer at normal viewing distance of the projected picture, and, when the individual polarizing elements are positioned opposite to the right and left image elements on the image screen, light from the right image elements can be directed through polarizing elements of one character while light from the left image elements can be directed through polarizing elements of a different character, so that the light from the right image elements has one polarity while the light from the left image elements has another polarity. By interposing a polarizing member appropriate to one of these polarities for one eye and a polarizing member appropriate to the other polarity before the other eye of the observer, the right and left eyes will see only the right and left image elements respectively. And since the image elements are scarcely if at all discernible individually, but blend with each other, the right eye will see only its right view and the left eye will see only its left view of the subject as in natural binocular vision, and the effect of stereoscopic relief will be obtained."

From this description, a person versed in the field will understand that such a display device will functionally take the place of another kind of plano-stereoscopic display, the Vectograph. The Vectograph has been, for the most part, neglected for many years. The Vectograph requires a complicated imbibition printing technique. For example, a full color Vectograph requires six printing steps, three each on two sheets, with the two sheets then laminated together. Despite the fact that high quality results are possible, the manufacturing difficulties are great. The process is described in "Polaroid Black and White Vectograph Images: A Guide," published by Polaroid in 1985.

Parsell goes on to describe screens having various patterns, some in the form of columns, and others with various patterns of tessellation, such as checkerboard patterns. Parsell does not address in any detail the means for manufacture of such a screen.

However, U.S. Pat. No. 2,301,254 to Carnahan (1942) does describe the manufacture of such a screen. He describes a process whereby a hopper spreads herapathite type material onto a substrate which has grooves or ridges therein, the hopper filling in the grooves or ridges with the material. The substrate is then subjected to an electric or magnetic field to orient the herapathite molecules. Two such sheets are fabricated and cemented to each other, each sheet having an appropriate polarization characteristic, in a checkerboard or columnar or other type of appropriate pattern. The sheets are assembled so that light passing through the combination must travel first through a region with one type of polarization characteristic and then through a region with the other type of polarization characteristic, these regions conforming to the specifications described by Parsell.

Willis was granted U.S. Pat. No. 2,309,879 (1943) in which similar art is described. Carnahan revisits his "Light Polarizing Screens and Method of Manufacture" in U.S. Pat. No. 2,385,687 (1945).

Dreyer was granted U.S. Pat. No. 2,617,329 (1951) for a device to vary the transmission properties of a surface such as a window. Although it is not a stereoscopic device, the art is so similar in terms of construction and actual embodiment that it does provide relevant means and discussions.

Reborn was awarded U.S. Pat. No. 2,647,440 (1952) which describes a further means for producing such a polarizing sheet with variable characteristics. He describes using a retardation sheet or a sheet which varies between isotropicity and anisotropicity in selected regions to produce rotation of the electric vector of plane polarized light to, in effect, create the type of polarizing screen that is the subject of this invention. This is described more fully in Reborn U.S. Pat. No. 2,631,498, and will be mentioned below.

Stipek was granted U.S. Pat. No. 2,623,433 (1952) for a similar type of display. In his case, he finds a means to turn anaglyphic projection into polarized light projection, thereby eliminating the distressing complementary colors associated with the anaglyph. Stipek uses the kind of a polarizing screen which is the subject matter of this invention. This is reminiscent of Benton in U.S. Pat. No. 4,431,265, but does not directly concern the art described here.

In U.S. Pat. No. 2,631,496 (1953), Reborn describes a means for creating a polarel sheet by sandwiching a retarder layer to a polarizer sheet to rotate the axes of linearly polarized light in selected regions. This citation is of importance because it is the earliest complete reference to describe the general approach used in this disclosure in a unique embodiment. Art of this kind has been also been discussed in Mears et al., British Patent No. 1 523 436 (1978) and in Verhulst, U.S. Pat. No. 5,007,715 (1991), described below. The Mears reference is significant because it is the first mention I can find in which electro-optics or LC technology is used to achieve the selected region retarder or anisotropic layer of Reborn.

Var was awarded U.S. Pat. No. 3,275,745 (1966) in which he describes a television system in which scan lines produce successive characteristics of polarized light because of the intimate juxtaposition of phosphors associated with the scanning beam and polarizing elements. A similar device for a flat panel display is described by Gale in U.S. Pat. No. 3,624,273 (1971).

Other relevant art may be found in the following references: Katou, Japanese Patent Publiction No. 58-184929 (1983); Beyer, German Patent No. 3,205,483 A1 (1983); Blin, German Patent No. 3,214,327 A1 (1983); and Puschel, U.K. Patent Application 2 111 798 A (1983). However, these references do not describe a manufacturing technique for the polarel panel.

In 1986, Marks was awarded U.S. Pat. No. 4,630,097 for a stereoscopic television system using a dot matrix cathode ray tube with polarizing elements in the form of circular regions covering the dot matrix pattern in a CRT display.

In an article entitled "Micro-Polarizer Arrays Applied to a New Class of Stereoscopic Imaging," S.I.D. '91 Digest, p. 840, Faris describes a method of manufacture for a type of imaging screen for producing polarized light in associated regions. His method for producing these screens is similar to the Vectograph technique, but he uses a high precision gravure cylinder to create his patterns with an iodine-based dichroic ink, rather than imbibition per se. This is an improvement on the Vectograph, enabling the production of a microfine pattern. This pattern, made up of sandwiched left and right sheets, produces the desired polarizing screen which Faris calls a "micropol" screen.

Verhulst, in U.S. Pat. No. 5,007,715 (1991), describes using a LC display with a pattern of retardation produced by having the conductive element of the display, made from indium tin oxide (ITO), form a suitable pattern of columns or checkerboards. The construction of LC cells is well understood, and need not be described here. Verhulst makes use of conventional construction and manufacturing techniques. By electrically energizing the device and driving the electrodes at a constant net electric potential, the facing electrodes will produce isotropic regions of LC because the LC molecules will be aligned in accordance with the direction of the electric field, which is perpendicular to the glass surfaces of the LC cell. The regions in which there is no electric field or no electrode material will be anisotropic and will produce the necessary retardation. This is in accordance with the method first described by Reborn, briefly discussed above, and is similar to the art taught by Mears. The result is a material with the properties first described by Parsell above.

Venolia, U.S. Pat. No. 5,050,961 (1991), and Franklin et al., U.S. Pat. No. 5,113,285 (1992), also describe relevant prior art.

SUMMARY OF THE INVENTION

I will now explain my invention which includes several important improvements over Faris, Verhulst, and others.

By comparing the present device to that which has been described by Verhulst, Faris, and others, we shall see how the present invention has many interesting advantages. There are similarities between the device disclosed here and the devices described by Mears and Verhulst. The Verhulst device depends upon the prior art concept of using retardation by creating interdigitated or interspersed regions of isotropic and anisotropic material to alternately toggle or not toggle the axis of incoming polarized light. In Verhulst, use of an LC device is described, but the device must be powered. Verhulst also suggests the use of ferroelectric devices, which must be at least initially powered. This means, as we shall see, that his device must be of a more complex construction than the device disclosed here. It needs to include the ITO layer, and although there is an increase in cost associated with the addition of this layer, the gravest disadvantage is that the device must be powered. In many applications, powering such a device would make it difficult or awkward to use. Moreover, if one could obtain the same or better result without applying any voltage, it would be a genuine improvement. The polarel panel described here is unique in that it uses an LC display device which does not require any electric power.

In the case of Faris, a gravure technique having microfine printing capability is used to print on polyvinyl sheets. This technique is similar to the Vectograph technique. Two of these sheets must then be placed in intimate juxtaposition in order to produce the necessary polarizing effect varying from region to region. Faris points out that the polarizing regions must overlap because of the difficulty in achieving alignment tolerances between the two sheets. This produces a reduction in light transmission. Moreover, the two panels must be applied to each other with exquisite precision. In the case of the polarel panel which I have described, it is intrinsically self-aligning and does not involve this concern.

The Faris technique requires a large capital investment to build machines to print the polarel screens. The invention which is the subject of this disclosure needs no such capital investment since conventional LC manufacturing lines may be employed.

The present invention employs a panel made up of a sheet polarizer, typically in intimate juxtaposition with an LC cell made up of regions of isotropic material interspersed with regions of anisotropic material, preferably twisted nematic liquid crystal (LC) material. The LC material, by means of optical activity, rotates the electric vector of incoming linearly polarized light through 90° in selected areas. The polarels are formed by the combination of incoming polarized light and the panel of LC and isotropic material. This panel must be held in intimate juxtaposition with the image and each polarel must correspond with the specific inter-pixilated areas of left and right image. The display contains interspersed polarized regions containing 50% of one characteristic and 50% of another characteristic. Means for using devices of this type are described for photographic and electronic displays.

DESCRIPTION OF THE PREFERRED EMBODIMENT

The present invention describes a method for manufacturing a plano-stereoscopic display in which left and right perspective viewpoints are displayed using a polarel screen. The observer wears a selection device of polarizing glasses whose left and right lenses have orthogonal axes of polarization, preferably in the inverted V configuration which has been the standard method for such displays for half a century.

The process may also use circularly polarized light in which left and right handed circular polarizing filters are used in the selection device glasses. As is well known in the art, it is easy to convert linear to circular polarized light by the addition of a properly aligned quarter wave retarder, and all of the descriptions given here may be applied to this means by the addition of such a retarder. The description here is not limited to the use of linear polarized light, but encompasses both linear and circular polarized light, or for that matter elliptically polarized light, and the specification is not limited to any particular orientation of the axes or choice of handedness.

In its most basic conceptual form, as enunciated over 50 years ago by Parcell and as mentioned above, a stereo pair made up of left and right images may be interdigitated in the form of columns or rows. In this disclosure, columns will be considered as being vertical going and rows will be considered as being horizontal going. The left and right perspective viewpoints will make up alternate columns or rows. If the interdigitated array is fine enough and the observer is greater than a certain distance from the array, it will be difficult or impossible to see the discrete polarpixel nature of the display, and each eye will perceive a seamless image which has an invisible structure.

Figure 1A:
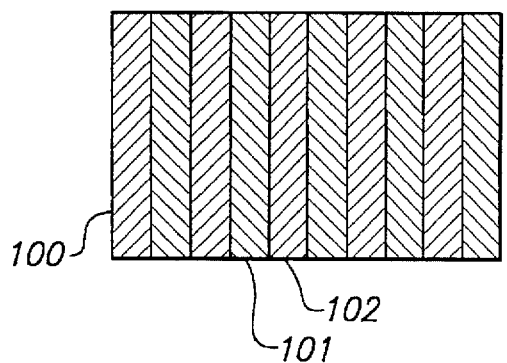
FIGS. 1A and 1B are diagrams of an interdigitated polarizing element array from a frontal view.
Figure 1B:
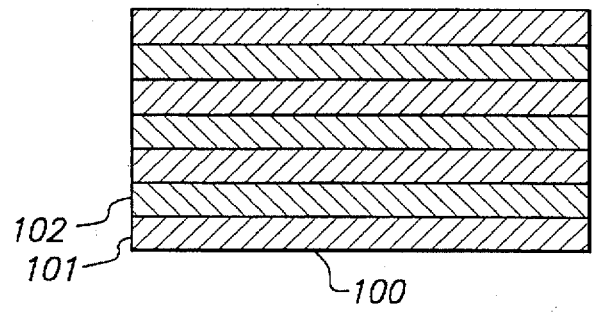

FIGS. 1A and 1B illustrate the interdigitated pattern of one general type of polarel panel 100 having columns (FIG. 1A) or rows (FIG. 1B) of polarizing elements 101 and 102 whose axes of polarization are at right angles to each other, as shown schematically by the cross-hatching in the figures. Just as it may be possible to conceive of taking a pair of photographic prints, for example, and cutting them up into strips and alternating them, it is also possible to conceive of taking a linear sheet polarizer, cutting it up into strips, and then placing these strips in intimate juxtaposition with the image elements. FIGS. 1A and 1B are magnified diagrams showing what such a combined array would look like if viewed from the front of the display.

Figure 3:
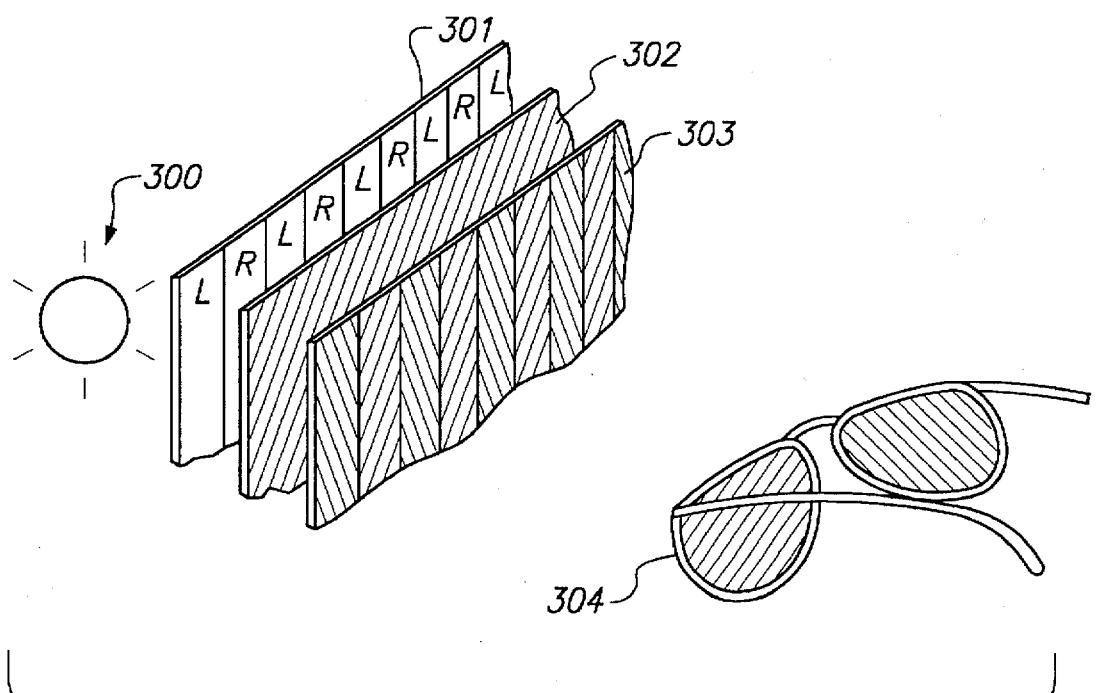
FIG. 3 is a diagrammatic representation of the interdigitated stereogram illuminated by a light source in intimate juxtaposition with a polarel panel.

The interdigitated array of left and right images, i.e., the alternating columns of pixels, will be referred to as an "interpixel" array, shown by element 301 in FIG. 3, and the elements of that array as interpixels. The polarel panel 100 is placed in front (from a viewer's perspective) of the interpixel layer 301. The combination of the interpixel array 301 and the polarel array 100 is called the polarpixel array (as noted above).

For the present embodiment, it is easiest from a manufacturing perspective to create a row-like array of interdigitated elements, and this discussion will focus on that approach. However, it would also be possible to develop techniques to produce patterns such as checkerboard, hexagonal, circular, triangular, and others. This discussion is not limited to the row-like approach, as anyone skilled in the art will understand.

Figure 2A:
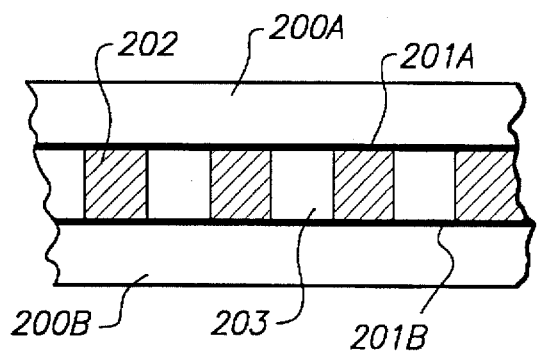
FIG. 2A is a cross section of the construction of the LC polarel cell using a build up of isotropic material.

FIG. 2A illustrates a cross section of the polarel array. The polarel array is constructed like a standard LC cell, with one exception: there is no ITO (indium tin oxide) conductor layer. The present invention is not a powered device, therefore, it does not need to be driven electrically. It is a passive stereoscopic LC display device, and, to the best of my knowledge, the only such device to be described in the literature.

The polarel array 100 includes a pair of flat glass sheets 200A and 200B facing each other in parallel planes. The glass sheets 200A and 200B are coated on their respective mutually facing surfaces with director alignment layers 201A and 201B. The director alignment layers 201A and 201B are preferably made from a polymer material, and they are buffed or rubbed to provide "guidance" for the LC material 202. A transparent isotropic material material 203 is laid down in columns (or rows) on one or the other of the glass sheets 200A and 200B, or possibly both. A preferred transparent material 203 is polyimide material, which is also the seal or gasket material used in the manufacture of LC cells. The LC material 202 is indicated by the cross-hatched areas of FIG. 2A.

The transparent material 203 may be a photolithographically defined material. Polyimide material is one choice, and the patterning of polyimides is a common practice. The processing of the polyimide layer is as follows. The substrates are coated with an aligning layer as is the usual practice, and cured so as to be stable to further processing. A layer of polyimide precursor, in the form of polyamic acid, is applied to yield a final film thickness of the desired gap between the two assembled substrates. The polyimide precursor is partially baked, and positive acting photoresist is applied and baked. The coated plate is exposed to UV light through a mask of the desired image. Subsequent development of the photoresist will etch the polyimide precursor from the exposed areas of the pattern. Solvent removal of the photoresist yields a plate with an image of the transparent material, which is baked to a final thickness. Other materials which are photolithographically definable may be used.

Figure 2B:
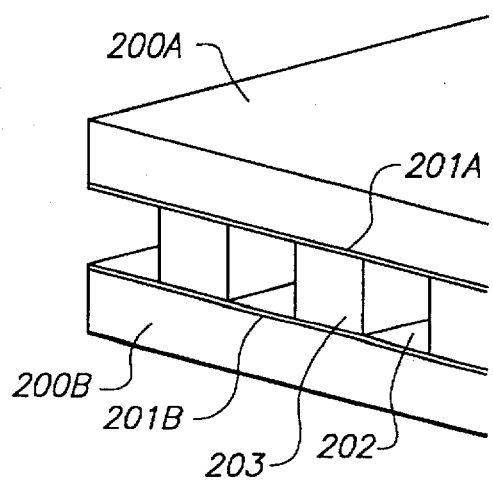
FIG. 2B shows a perspective view of the construction of the LC polarel cell of FIG. 2A.

A perspective view of the polarel array is illustrated in FIG. 2B. The glass sheets 200A and 200B are approximately 0.02 to 0.04 inches thick, and the director alignment layers 201A and 201B are approximately 500 angstroms thick. The separation or gap between the director alignment layers 201A and 201B is typically on the order of a 5 to 9 microns, and the seal material 203 and LC material 202 (crosshatching left off for clarity) will be formed in alternating columns each having a width of approximately 25 microns and a thickness that will fill the gap between the sheets or the director alignment layers 201A ans 201B.

The seal material 203 is formed first in columns as shown, and the LC material 202 is filled into the interstices between the columns of seal material 203 using standard manufacturing techniques. Each column of LC material 202 and seal material 203 has an equal width (hence area).

The transparent material 203 is isotropic and has neither birefrigent nor optical activity properties. On the other hand, LC material 202 has the property of optical activity since it is, in the preferred embodiment, a twisted nematic material. If the director alignment layers 201A and 201B are rubbed so that the rub directions are orthogonal, the LC molecules will then be oriented in a fashion to encourage the creation of what people in the LC field call "the wave guide effect," but which physicists call "optical activity."

Under such conditions, the directors of the LC material will form a spiral, and this spiral causes the axis of incoming linear polarized light to be rotated. If the LC material is properly chosen and the gap is carefully chosen, then the axis of the incoming linearly polarized light will be rotated 90 degrees.

The LC material is, as stated, of the twisted nematic type, and the criteria for selection is broad since the device will not be powered. A major consideration with regard to the design of the device is that the product of the distance of the gap and Δn (the difference of the principal refractive indices) must meet the Gooch-Tarry minimum as set forth in their well-known paper, "Optical Characteristics of Twisted Nematic Liquid-Crystal Films" (Electronics Letters, 10 Jan. 1974, Vol. 10, No. 1).

The result will then be as shown schematically in FIG. 1, namely a panel 100 with two different alternating regions 101, 102 which act on incoming linear polarized light to produce polarized light with mutually orthogonal axes. Polarized light that passes through the transparent isotropic regions 203 will maintain its axis orientation, whereas the polarized light which passes through the transparent twisted nematic LC material 202 will have its axis toggled through 90 degrees.

Figure 2C:
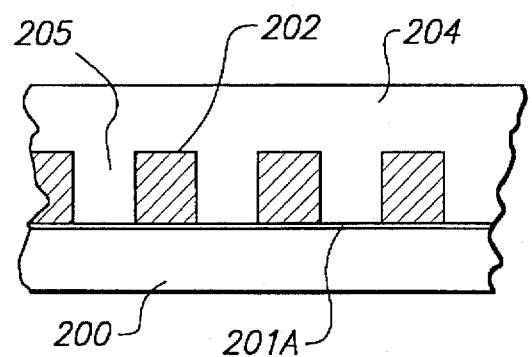
FIG. 2C is a cross section of the construction of the polarel cell using the etched glass technique.

An alternative way to build the LC portion of the polarel panel uses birefringence rather than optical activity. Birefringence may be created at either or both of the director alignment layers 201 by rubbing the director alignment layers 201 in a parallel direction. However, and most importantly, it is possible to obtain sufficient birefringence and hence retardation or phase change with a single rub layer as shown in FIG. 2C. In such a case, the axis of incoming linearly polarized light will be toggled through 90 degrees. The explanation for the toggling of the axes is the phase shift at the surface layer, rather than optical activity.

My experiments have indicated that this may be accomplished using Merck 1565 LC material. An LC cell with only one of the director alignment surfaces was rubbed, and it was observed that the required rotation of the axis of polarized light took place over most of the surface of the cell.

Therefore, rather than laying down columns of transparent isotropic seal material 203, the glass surface 204 is etched (or removed by some process) to created alternating columns 205. The interstices between these columns 205 will be filled in a later step with LC material 202.

It is now impossible to add a director alignment layer to the area between and beneath the columns 205 and to then properly rub these regions. However, it is possible to add a director alignment layer 201a to the facing sheet of the flat, non-etched glass sheet 200a. The director alignment layer 201a is properly rubbed and then brought into contact with the glass sheet 204. The interstices between columns 205 may now be filled with LC material 202 using standard manufacturing techniques. The LC material 202 in contact with the rub layer 201 produces the birefringence effect so as to toggle the axis of incoming polarized light. The result is a passive non-powered device, similar in performance to the device illustrated in FIG. 2A and 2B, but using a different construction, and with the principal of birefringence rather than optical activity as the basis for the rotation of the axis of the linearly polarized light.

FIG. 3 is a drawing of the display ensemble, in which interpixel array 301, polarizing sheet 302, and polarel panel 303 are held together in intimate juxtaposition in parallel planes, such that the interpixels and polarels are aligned to form polarpixels. The interpixel array 301 might be any one of several types of image source, such as a photographic transparency, a matrix type LC panel, or a cathode ray picture tube. In the case of a rear illuminated imaging medium, the interpixel array 301 represents a stereogram which has been interdigitated and marked L R L R L R . . . and which is illuminated by light source 300.

Element 302 indicates a sheet of linear polarizing material with the hatch marks representing the axis of polarization. Element 303 is a diagrammatic representation of the LC portion of the polarel panel, wherein the hatch marks represent axes of polarized light which are mutually orthogonal from column to column, said columns having been created as described with the aid of FIGS. 1A, 1B, 2A and 2B. Note that polarizer sheet 302 and LC cell 303 together make up the polarel panel. Element 304 is a pair of linear polarizing spectacles which may be worn by the viewer with the hatch marks indicating the axes of polarization. The viewer, when wearing the eyewear, sees alternate columns in each eye and the result is a stereoscopic display with each eye seeing its appropriate perspective viewpoint.

In the preferred embodiment employing twisted nematic LC material, which depends upon optical activity, there is a relaxed relationship between the rub direction of the director alignment layer and the axis of the linear sheet polarizer. The phenomenon of optical activity, unlike the phenomenon of birefringence, does not depend on a phase change or resolution of waves into orthogonal components, and hence, the angle formed by the axis of the polarizer and axes of the director layers is not critical. Therefore, the axis of sheet polarizer 302 may be at any angle, given that the LC portion of the polarel panel is twisted nematic LC material. As a practical matter, there is a best angle to chose, namely that at which the transmission will be maximized and the transmitted light will be clear rather than colored, and this occurs when the axes of the sheet polarizers are orthogonal.

It is important to adjust the sheet polarizer analyzers in spectacles 304 so that one is parallel and the other orthogonal to the axis of sheet polarizer 302. As has been mentioned earlier in this disclosure, one versed in the art will understand that circularly polarized light may be created at the display by the addition of a quarter wave plate and that the polarizing spectacles may contain circular analyzers.

FIG. 3 illustrates a stereoscopic flat panel display of the LC type for video or computer graphics, or electronic images, in which case element 301 is a matrix LC display, and there would be an additional sheet polarizer (not shown) between the LC matrix display 301 and the light source 300 required for the creation of optical density. The display may be used for direct viewing or for projection. Alternatively, the display panel 301 may be of some other type such as an electroluminescent panel, and there are also various other types of electronic displays which might be employed, and the adaptation of these devices to this polarel application will be obvious and straightforward to those versed in the art.

Such a display might be made up of a photograph at 301, possibly in the form of a transparency which is rear illuminated by light source 300. Such an interdigitated photograph may be created either by contact printing or by standard projection enlargement techniques, in which case, the print may be exposed through the polarel panel in the following manner. A sheet polarizer may be interposed between the printing light source and the printing master for one perspective viewpoint during one exposure. If the sheet polarizer is properly oriented it will blank out one set of columns and expose only the alternate columns. When the film with the other perspective view is used for making the second exposure of the print, the sheet polarizer is rotated through 90 degrees, so that the unexposed columns (or rows) will now be exposed, and the exposed columns (or rows) will not be double exposed. The result is a photographic print or transparency 301, which will have the desired interdigitated effect. When sandwiched together with the polarel panel comprising sheet polarizer 302 and LC cell 303, the stereoscopic effect may be viewed with polarizing spectacles 304.

In the case of a photographic transparency at 301, the sheet polarizer 302 may be placed as shown, between the interpixel 301 and the polarel array 303, or it may be placed between the light source 300 and the interpixel array 302. In the latter case, the parallax artifact, discussed below, is reduced.

A polarel transparency may be viewed on a light box or projected using a slide projector or overhead projector. Polarel prints may be viewed from the front, just like any photographic print.

There is a parallax artifact, not to be confused with stereoscopic parallax, which comes about because of the thickness of glass which is needed for the LC polarel array. Although glass is currently used for the manufacture of LC displays, it is contemplated that the use of plastic for LC displays will be mastered, and this disclosure is not intended to be limited to glass, but anticipates the use of plastic materials which may be manufactured in thinner versions than glass to thereby reduce the parallax artifact discussed here.

For now though, we must consider a device made with glass. The thickness of the glass between the interdigitated image plus the thickness of the polarizer necessary keeps the LC cell (or polarel) some distance from its corresponding interpixels. If the viewer moves his or her eyes off the central vertical axis of the display, formed by a line dropped perpendicular to the plane of the display screen from a location above the geometric center of the display, he or she will then tend to see an unwanted interpixel juxtaposed behind a polarel element. Thus, there is a tendency for the viewer to see a pseudoscopic rather than a true stereoscopic image when off axis. Of course, this effect depends upon the width of the interpixels and polarel, the distance between interpixel and polarel, and ultimately, the distance of the observer from the display. The greater the distance of the polarels from the interpixels, the less the angle of view over which an acceptable image may be seen. A narrower interpixel has a more extended angle of view. Since the viewing angle is a wedge or triangular shape in space in front of the display, there will be more viewing area available to see the stereoscopic image rather than a pseudo image as the viewer movers further away from the display. Therefore, the usable angle of view is inversely proportional to the width of the polarpixel and the distance of the polarel panel from the interpixel.

I have determined by experiment that it is preferred to arrange the image stripes of interpixel array 301 in a horizontal rather than a vertical direction for many applications. I have not found this suggestion made in the literature. Given horizontal rows, rather than vertical columns, there is no sensitivity to head movement in the horizontal direction since there is no relative rejuxtaposition between interpixel and polarel. The issue is then one of having enough vertical angle of view, which in many cases is sufficiently broad to allow for comfortable head movement. Moreover, it is possible to predict the height of the viewer's eyes in many applications, such as when he or she is seated in front of a monitor at a workstation. The angle of the vertical wedge may be adjusted to accommodate the location of the viewer's eyes by means of the relative juxtaposition of the interpixels and the polarel panel.

In addition, it is my observation that the interdigitated structure of the image is less visible when the interpixels are horizontal going rather than vertical going, possibly because we are accustomed to looking at video images with a horizontal scanning structure.

When images are projected, such as in a video or by an overhead projector, there is no angle of view issue since there is no effective parallax between the interpixels or imaging sheet and the polarels themselves when projected on a screen.

Figure 4A:
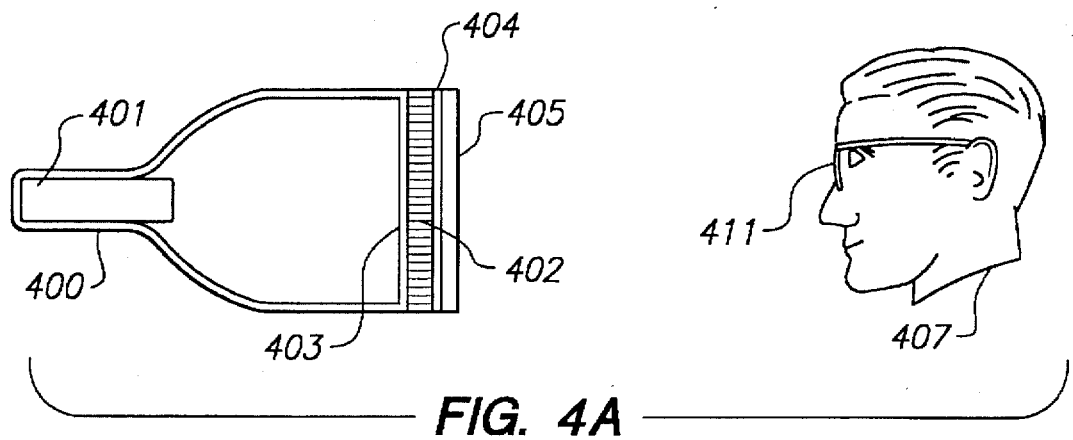
FIG. 4A is a diagrammatic cross section of a cathode ray tube using the interdigitated stereogram and polarel with a fiber optics face plate.
Figure 4B:
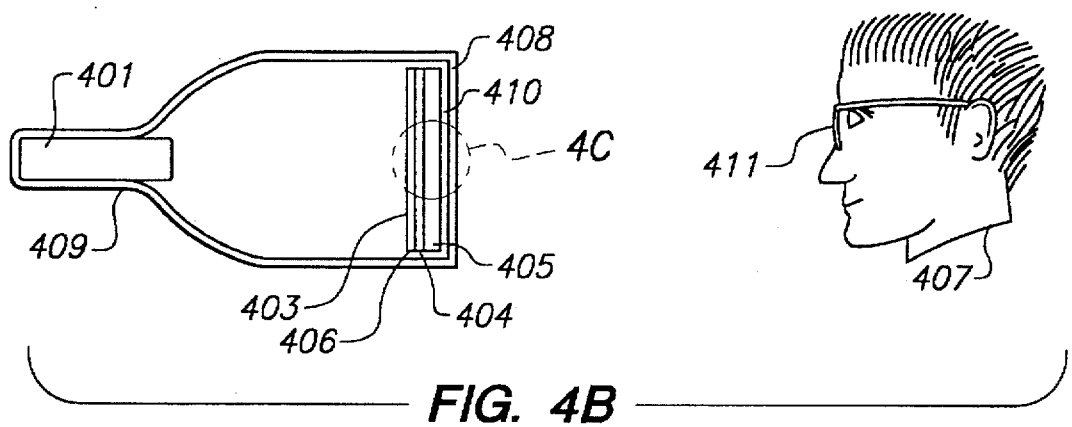
FIG. 4B is a cross section of a cathode ray display tube with an inserted glass sheet coated with phosphor juxtaposed with a polarel sheet.
Figure 4C:
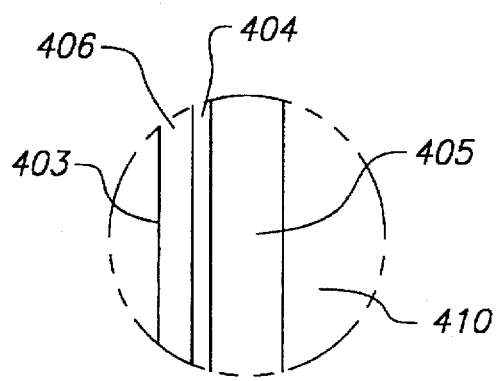
FIG. 4C is an enlarged view of the circled portion of FIG. 4B.

Referring to FIGS. 4A and 4B, a technique for using the present invention with a cathode ray tube (CRT) will be discussed. A major challenge with regard to use of a polarpixel display with a CRT is the reduction or elimination of the parallax effect between the polarels and the interpixels that would inherently result due to the thickness of the glass faceplate for the CRT. A glass faceplate is of course necessary to prevent an implosion in an evacuated tube. Means for overcoming this problem are shown in FIGS. 4A and 4B.

In FIG. 4A, a cathode ray tube 400 has an electron gun 401. A phosphor coating 403 is in intimate juxtaposition with a fiber optic panel 402. A polarizer 404 is placed on top of the fiber optic panel 402. Alternatively, the polarizer 404 may be placed between the phosphor screen 403 and the fiber optic panel 402 (not shown). An LC portion 405 of the polarel panel is placed in intimate juxtaposition with the polarizer 404. It is the purpose of the fiber optic panel 402 to optically convey the phosphor image as close as possible to the polarel panel so that the interpixel elements are in more intimate juxtaposition with the polarel elements to form the appropriate polarpixel array. This array may then be viewed by the observer 407 wearing polarizing glasses 411. Fiber optic faceplate CRT displays have been manufactured for various applications for many years.

In FIG. 4B, another solution to the parallax artifact problem is presented. CRT 409 has electron gun 401. The faceplate of the cathode ray tube is indicated by 408. An insert 410 is within the CRT 409 and may be viewed through faceplate 408. The purpose of this insert 410 is to promote the intimate juxtaposition of the phosphor image elements with the polarel sheet without the need for the faceplate. The insert 410 comprises the phosphor image elements 403 which are coated on glass sheet 406 in intimate juxtaposition with polarizing sheet 404. Polarizing sheet 404 is in intimate juxtaposition with the LC panel 405. The resulting combination of interpixels and polarel panel are viewed through polarizing spectacles 411 by observer 407.

Figure 5A:
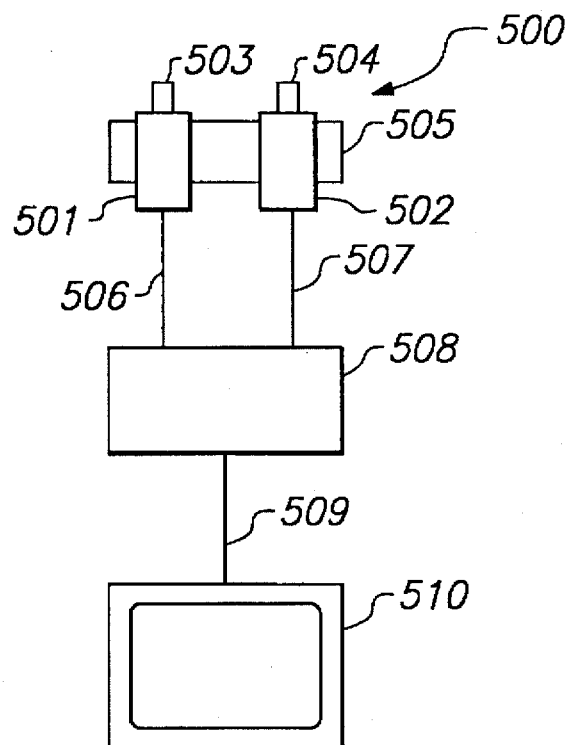
FIGS. 5A, 5B are schematic representations of the stereoscopic camera and means for producing the interdigitated stereo pair, and means for displaying the stereo pair.

The concern of creating electronic images for such a display will now be addressed. In the case of a computer generated image, it is clear that the interdigitated pixel array may be produced in software. In the case of a video system, it is necessary to digitize and interdigitate the left and right images as shown in FIG. 5A.

A stereoscopic camera 500 includes camera heads 501 and 502 having lenses 503 and 504, respectively. The camera heads 501, 502 are mounted on base 505. The camera heads 501, 502 transmit video outputs through cables 506 and 507, respectively, to digital converter 508. The digital converter 508 digitizes and then interdigitates the video signals, then transmits them over transmission line 509 to be displayed on monitor 510 (or recorded or broadcast).

Figure 5B:
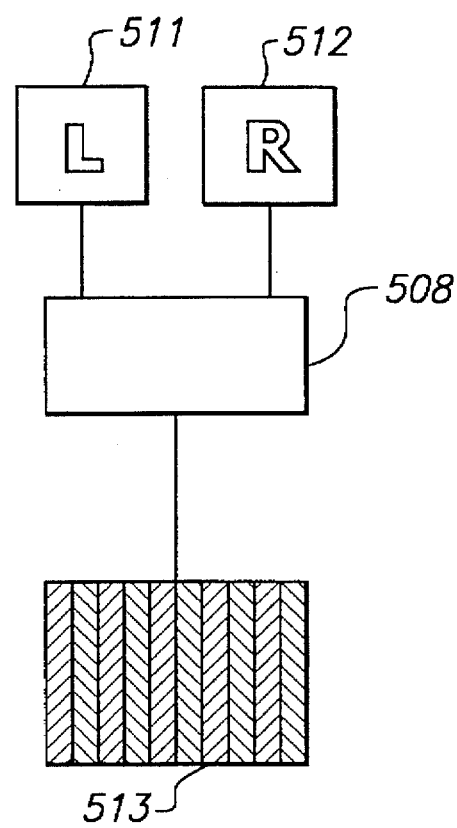

A schematic representation of this process is shown in FIG. 5B. The stereo pair of left image 511 ((L) and right image 512 (R) are conveyed to a digital device 508, and then the interdigitated image is displayed on the display screen as the polarpixel array 513. The polarpixel array 513 is shown in the form of columns, but might also be in the form of rows, or other arrangements as described above. This technique makes it possible to use camera heads which conform to existing video broadcast protocols, such as PAL and NTSC, since the conversion of their analog signals to digital formats is routine.

The state of the art in digital electronic technology is more than adequate for accomplishing conversion and interdigitation as set forth above. The analog video outputs 506, 507 of camera heads 503, 504 are converted into a digital signal by digital converter 508. This digital signal may then be turned into the suitable interdigitated image by techniques which are straightforward and well known in the art. This interdigitated or mixed signal is then transmitted via transmission line 509 to the display monitor 510. The image may just as well be projected and it may be conveyed to the monitor by any one of various means such as cable transmission, through the air broadcast, closed circuit, or any form of recorded medium. The display monitor may use any display transducer such as LC panel or a cathode ray display.

It is important to note that display 510 operates at the usual 60 fields per second rate, rather than the rate of 120 fields per second as is required for field sequential displays of a flickerless nature. In every respect, such a signal will met the specifications of any broadcast protocol, such as NTSC or PAL.

The columnar arrangement of interpixels combined with the usual technique of horizontal scanning for video and computer graphics creates a dot sequential, or more properly, an interpixel sequential presentation of the two perspective points of view. The switching rate of the interpixels is substantially above the critical fusion frequency, thus no flicker is perceived. The key concept is that the combination of columns of interpixels with a direction of scanning which is orthogonal to the columns, will produce the sequential switching necessary for flicker-free viewing.

However, this vertical going arrangement of columns is at odds with the requirements for a broad viewing angle, which is best provided by horizontal going rows of interpixels. There are two solutions to the problem of creating a flickerless image having a broad angle of view. One method, that of doubling the vertical scanning rate, will be discussed in a moment. First, we will discuss the alternative of using rows of horizontal interpixels and their associated polarels to improve the angle of view which is constrained by the parallax artifact. This can be accompanied by using vertical scanning rather than standard horizontal scanning in order to achieve switching at the interpixel level. If the electron beam for a cathode ray tube display scans vertically, or the elements of a matrix display are addressed in a sequence of vertical columns, and they scan across the rows of interpixels, we will have the desired effect. In all probability, the most successful combination of technical elements is the vertical scanning approach with the horizontal polarpixels used in conjunction with a flat panel screen, such as an LC active or passively addressed matrix.

The vertical going scanning can be created using the arrangement in FIG. 5 in which the digital controller 508 digitizes the analog images produced by the two cameras and interdigitates them into horizontal rows of alternating left and right images while simultaneously creating vertical scanning of the image. This approach preserves the ability to use existing cameras, such as any off-the-shelf NTSC or PAL camera. Such an on-the-fly conversion is well within the state of the art. Although FIG. 5 shows columns rather than rows, it is easy to imagine the output being rows.

The approach in which two cameras are used represent a significant improvement over the camera arrangement given in Verhulst, for his camera optically combines the left and right images and mixes them on the face of a single light sensitive surface. Such an optical arrangement has limitations with regard to the ability to vary the interaxial separation between camera lenses, and thus change the stereoscopic effect. It also precludes the use of wide angle lenses because mirrors are used in the system, and such lenses are of great importance in videography.

It is also possible for the digital controller 508 to be incorporated within monitor 510, in which case the digital controller 508 can convert field sequential stereoscopic images into a column, row, or dot sequential stereoscopic display. The idea of combining the field sequential and dot sequential approaches will be discussed below.

If rows of polarpixels are created, the perceived image will flicker if the display refreshes at 60 fields per second, given that the rows correspond to the location of the scan lines produced by video interlace. In that case, each eye will see only 30 fields per second. As discussed above, there is merit to having rows rather than columns in terms of angle of view considerations. One approach is to double the refresh rate, i.e., to 120 fields per second in NTSC countries, or to 100 fields per second in PAL countries. This is the approach taken by the applicant in U.S. Pat. No. 4,523,226, and is the basis for a number of products. In this case, the advantages of horizontal rows in terms of viewing angle can be had in conjunction with the established 120 fields per second approach. A system may be developed which would use either the polarpixel approach, or the electronic eyewear approach as set forth U.S. Pat. Nos. 4,884,876, and 4,967, 268. Thus the user would have a choice of passive glasses to view the image with a polarpixel monitor, or the active eyewear to view a conventional screen.

I claim:

1. A plano-stereoscopic display, comprising:

an interpixel array of images;

a polarizing sheet having a polarization axis; and a polarel panel having a plurality of isotropic regions interspersed with a plurality of liquid crystal regions, comprising a pair of substantially flat, parallel transparent sheets having a gap therebetween, a director alignment layer coating at least one of an opposing surface of said transparent sheets, and wherein said regions of isotropic material interspersed with said regions of liquid crystal material fill said gap, wherein the interpixel array, the polarizing sheet, and the polarel panel are held together in intimate juxtaposition.

2. A plano-stereoscopic display, comprising:

an interpixel array of images;

a polarizing sheet having a polarization axis; and a polarel panel having a plurality of isotropic regions interspersed with a plurality of liquid crystal regions, comprising a first substantially flat transparent sheet having a director alignment coating on an inside surface thereof, a second substantially flat transparent sheet generally parallel with and affixed to the first sheet and having a plurality of grooves formed on an inside surface thereof, said grooves being filled with a liquid crystal material to thereby create said interspersed regions of isotropic material and liquid crystal material;

wherein the interpixel array, the polarizing sheet, and the polarel panel are held together in intimate juxtaposition.

* * * * *